(No Model.) 2 Sheets—Sheet 2.
A. BUCHHOLZ.
FIFTH WHEEL.
No. 340,693. Patented Apr. 27, 1886.
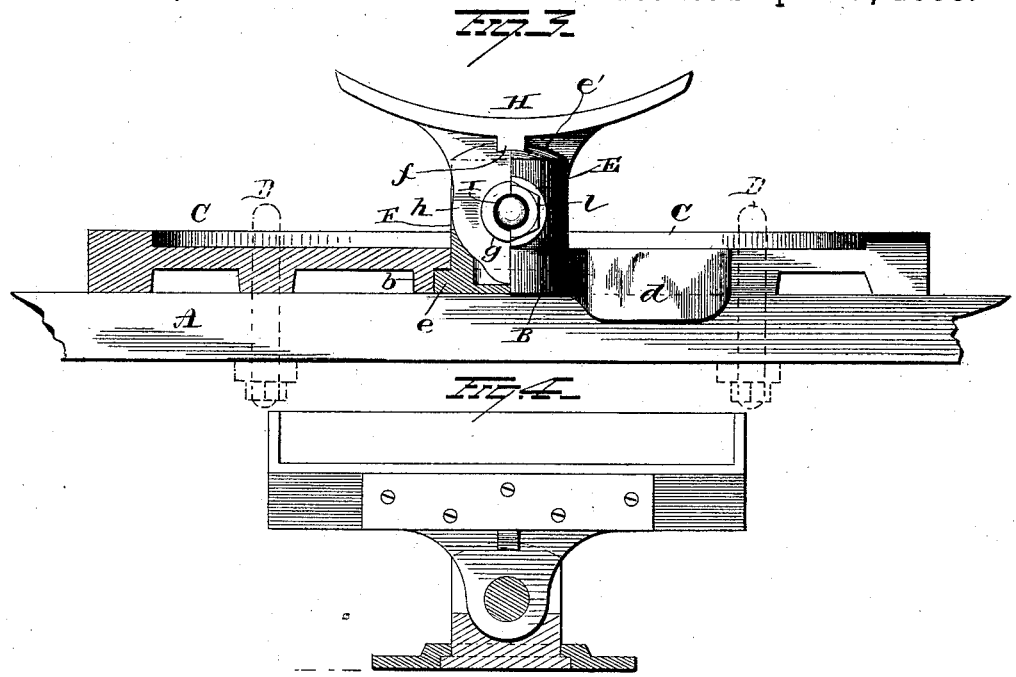
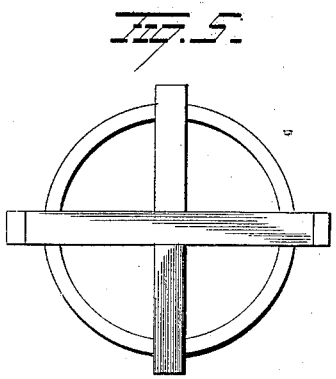
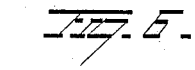
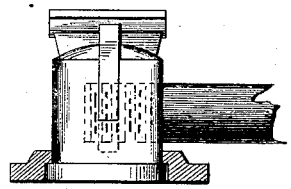
WITNESSES
INVENTOR
August Buchholz
Attorney

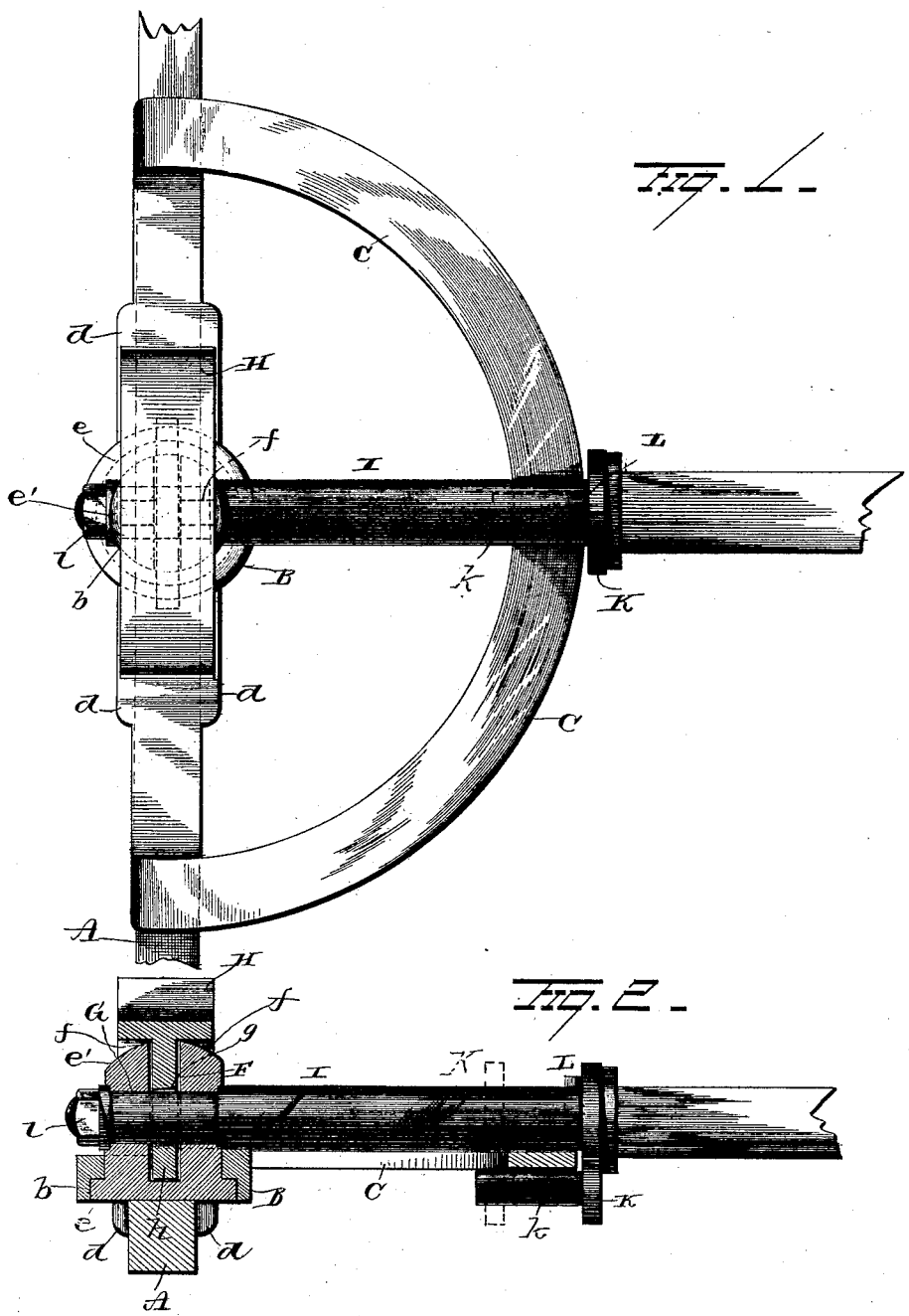

UNITED STATES PATENT OFFICE.

AUGUST BUCHHOLZ, OF SOUTH BEND, INDIANA.

FIFTH-WHEEL.

SPECIFICATION forming part of Letters Patent No. 340,693, dated April 27, 1886.

Application filed January 29, 1886. Serial No. 190,173. (No model.)

*To all whom it may concern:*

Be it known that I, AUGUST BUCHHOLZ, of South Bend, in the county of St. Joseph and State of Indiana, have invented certain new and useful Improvements in Fifth-Wheels; and I do hereby declare the following to be a full, clear, and exact description of the invention, such as will enable others skilled in the art to which it appertains to make and use the same.

My invention relates to an improvement in fifth-wheels for vehicles.

The object is to reduce the number of parts to a minimum and at the same time admit of the greatest latitude of movement in all required directions.

A further object is to provide strong and durable fifth-wheel mechanism, which shall render the liability to damage from breakage or loss much less than that hitherto experienced where the ordinary king-bolt is employed.

With these ends in view my invention consists in certain features of construction and combinations of parts, as will be hereinafter described, and pointed out in the claims.

In the accompanying drawings, Figure 1 is a view of a portion of the front axle and reach and the fifth-wheel mechanism in plan. Fig. 2 is a vertical section taken through the longitudinal axis of the reach. Fig. 3 is a front view. Figs. 4, 5, and 6 are modifications.

A represents the front axle of a vehicle. On the central portion of the axle A is secured a bar, B. The bar B has the semicircular guide-bar C rigidly attached to its ends, and is conveniently secured to the axle by a pair of clips, D, as shown. It is further held against a lateral movement on the axle by lips $d$, which extend down over the front and rear edges of the axle.

At its center, over the middle point of the axle A, the bar B is provided with a circular opening, $b$, through which the head-block E extends, as follows: The opening $b$ is enlarged on the under side of the bar B to receive the enlarged head $e$ of the head-block, by means of which the head-block is securely locked in position with its flat enlarged head bearing directly on the axle. The stem of the head-block extends upwardly through the opening $b$, in which it has a free rotary movement. The height to which it extends depends upon the size of the front wheels of the vehicle relatively to the size of the hind wheels, it being a very simple and satisfactory device for equalizing the heights of the front and back springs. The upper end of the head-blocks is rounded, as shown at $e'$, and it is provided with a centrally-located open slot, F. A perforation, G, extends through the head-block E transversely to the slot F.

A spring-rest, consisting of a curved plate, H, is provided with a depending flange or lug, $h$, adapted to fit loosely within the slot F, in which it is securely locked by the front end of the reach I, which extends loosely through the perforation G, and a corresponding perforation, $g$, in the flange or lug $h$. On the front and rear sides of the flange or lug $h$ the plate H is provided with concave-faced bearings $f$, which conform to the curve of the rounded end $e'$ of the head-block. The spring-rest H is thus free to rock from side to side, bearing on the head-block, or on both the head-block and the reach; or, supposing the wagon-body to remain in an adjustment parallel with the general plane of the road, the wheels are free to follow the irregular depressions in the road, which commonly tilt the body from side to side, without affecting the body; or one of the wheels may run on a higher plane than the other without disturbing the horizontal plane of the body. At the same time the axle A may be swung around on the head-block as a pivot, as in turning around, without disturbing the position of the spring-rest.

To secure the reach to the semicircular bar C, and at the same time leave the axle A free to tilt from side to side, the reach is rounded at the point where it crosses the bar C, and an elongated washer or hanger plate, K, is loosely mounted thereon and provided with a retaining pin or stud, $k$, which projects forwardly beneath the bar C, and holds the latter in close proximity to the under side of the reach.

A pin, L, is set in the reach in front of the hanger plate or washer K, and serves to keep the latter in position; or there may be a pair of hanger-plates, K, one located at the rear and one in front of the circle-bar, and connected beneath the circle-bar by the pin $k$.

The front end of the reach is provided with a nut, $l$, which serves to lock it in position for use. The nut $l$ is provided with suitable means for locking it against accidental displacement.

When the fifth-wheel mechanism above described is used in connection with a farmer's wagon or "lumber-wagon," as it is commonly called, the spring-rest H may be replaced by an iron bar, upon which the front end of the wagon-body could be directly secured. A construction of this character is shown in the modification represented in Fig. 4.

In a truck where it is desirable to have the front wheels turn under the reach the rest H might be formed in the shape of a pair of cross-bars, as shown in Fig. 5, and a full-circle bar employed.

In the construction of light wagons and buggies the reach may be provided with a threaded front end and terminate in a threaded socket within the head-block and spring-rest, as shown in Fig. 6. The bar B may be pillowed on the intervening bar or block instead of on the axle itself, and in wagons where it is desirable to use two front springs the spring-rest may consist of a bar reaching a suitable distance to the right and left, and other changes might be resorted to in the form and arrangement of the several parts without departing from the spirit and scope of my invention; hence I do not wish to limit myself strictly to the construction herein set forth; but, Having fully described my invention, what I claim as new, and desire to secure by Letters Patent, is—

1. In a fifth-wheel mechanism, the combination, with a bar having an opening therein and a head-block adapted to form a pivot on which the axle swings, the said head-block passing through the opening in the bar, and having an enlarged head resting in contact with the under surface of said bar, of a wagon-body support secured to the head-block in tilting adjustment, substantially as set forth.

2. In fifth-wheel mechanism, the combination, with an axle, a bar rigidly secured thereto and having an opening therein, a head-block having an enlarged head, the latter resting in contact with the under surface of said bar, and a reach-bar passing loosely through the head-block, of a body-support secured to the head-block in tilting adjustment, substantially as set forth.

3. The combination, with the bar connecting the ends of the curved guide-bar and means for securing the said connecting-bar to the axle, of the head-block extending loosely through the connecting-bar and provided with an enlarged head adapted to rest on the axle, substantially as set forth.

4. The combination, with the head-block resting on the axle and a bar secured to the axle and holding the head-block in position, of the spring-rest and the reach extending through the head-block and locking the spring-rest in tilting adjustment thereto, substantially as set forth.

5. The combination, with the head-block resting on the axle and having a rounded upper end, and a bar secured to the axle and holding the head-block in position thereon, of the spring-rest resting on the rounded upper end of the head-block and the reach extending through the head-block and locking the spring-rest in tilting adjustment thereto, substantially as set forth.

6. The combination, with the axle secured to the reach in tilting adjustment and the circle-bar extending beneath the reach, of the swinging washer or hanger-plate, substantially as described, adapted to hold the circle-bar in close proximity to the reach, substantially as set forth.

7. The fifth-wheel mechanism, consisting, essentially, of the head-block resting on the axle and secured thereto by a removable bar carrying the circle bar, the spring-rest bearing on the head-block and secured thereto by the reach, and the plate for securing the circle-bar to the reach, substantially as set forth.

In testimony whereof I have signed this specification in the presence of two subscribing witnesses.

AUGUST BUCHHOLZ.

Witnesses:
S. A. KLINE,
J. H. HIBBERD.